US011067221B1

(12) United States Patent
Johnson et al.

(10) Patent No.: US 11,067,221 B1
(45) Date of Patent: Jul. 20, 2021

(54) HAND HYGIENE SYSTEM AND METHOD OF USE

(71) Applicants: Robert F. Johnson, Arlington, TX (US); Homer L. Cole, Arlington, TX (US); Jamie Moore, Arlington, TX (US)

(72) Inventors: Robert F. Johnson, Arlington, TX (US); Homer L. Cole, Arlington, TX (US); Jamie Moore, Arlington, TX (US)

( * ) Notice: Subject to any disclaimer, the term of this patent is extended or adjusted under 35 U.S.C. 154(b) by 0 days.

(21) Appl. No.: 16/799,070

(22) Filed: Feb. 24, 2020

Related U.S. Application Data

(63) Continuation-in-part of application No. 16/412,490, filed on May 15, 2019.

(51) Int. Cl.
*F16M 13/02* (2006.01)
*A47K 5/12* (2006.01)

(52) U.S. Cl.
CPC .............. *F16M 13/02* (2013.01); *A47K 5/12* (2013.01)

(58) Field of Classification Search
CPC ........ F16M 13/02; A47K 5/12; A61G 7/0503; A61G 7/047; A61G 1/04; A61G 5/10; G08B 21/245; G16H 40/20; A47C 21/003
USPC ....................................... 248/205.1; 5/503.1
See application file for complete search history.

(56) References Cited

U.S. PATENT DOCUMENTS

| | | | | |
|---|---|---|---|---|
| 1,453,877 A * | 5/1923 | Johnson ................. | A63D 15/16 | 473/38 |
| 2,253,847 A * | 8/1941 | Crum ................... | A61G 7/0503 | 248/231.81 |
| 2,609,982 A * | 9/1952 | Johnson ................. | G07F 13/00 | 222/2 |
| 2,957,187 A * | 10/1960 | Raia ..................... | A61G 7/0503 | 5/503.1 |
| 3,026,079 A * | 3/1962 | Stack ................... | A61G 7/0503 | 248/122.1 |
| 3,709,556 A * | 1/1973 | Allard ................. | A61M 5/1415 | 297/188.2 |
| 4,355,640 A * | 10/1982 | Johnson .............. | A61M 3/0245 | 222/368 |
| 4,511,157 A * | 4/1985 | Wilt, Jr. ................... | A61G 5/10 | 280/304.1 |
| 4,572,536 A * | 2/1986 | Doughty .................. | A61G 5/10 | 280/304.1 |
| 4,945,592 A * | 8/1990 | Sims ........................ | A61G 7/05 | 248/129 |
| 4,974,753 A * | 12/1990 | Tucker ..................... | A47K 5/12 | 141/363 |
| 5,016,307 A * | 5/1991 | Rebar ................... | A61G 7/0503 | 5/503.1 |
| 5,078,349 A * | 1/1992 | Smith ................. | A61M 5/1415 | 248/125.8 |
| 5,094,418 A * | 3/1992 | McBarnes, Jr. ...... | A61G 7/0503 | 248/125.1 |

(Continued)

*Primary Examiner* — Nicholas F Polito
*Assistant Examiner* — Luke Hall
(74) *Attorney, Agent, or Firm* — Leavitt Eldredge Law Firm

(57) ABSTRACT

A system includes a support structure and a sanitation device secured to the support structure, the sanitation device is configured to dispense a material for removing germs. The method includes securing the sanitation device to the support structure and dispensing a sanitation fluid from the sanitation device.

2 Claims, 8 Drawing Sheets

(56) References Cited

U.S. PATENT DOCUMENTS

| | | | | |
|---|---|---|---|---|
| 5,135,191 A * | 8/1992 | Schmuhl | A61G 1/04 | 248/125.1 |
| 5,149,036 A * | 9/1992 | Sheehan | A61G 7/0503 | 248/215 |
| 5,219,139 A * | 6/1993 | Hertzler | A61G 5/10 | 248/276.1 |
| 5,374,074 A * | 12/1994 | Smith | A61G 5/10 | 280/304.1 |
| 5,588,166 A * | 12/1996 | Burnett | A61G 7/05 | 248/214 |
| 5,655,563 A * | 8/1997 | Johnson | B08B 3/00 | 137/115.15 |
| 5,687,942 A * | 11/1997 | Johnson | F16B 3/00 | 248/223.41 |
| 5,738,135 A * | 4/1998 | Johnson | B08B 3/00 | 137/119.06 |
| 5,987,670 A * | 11/1999 | Sims | A61G 7/05 | 5/503.1 |
| 6,036,147 A * | 3/2000 | Militzer | A61M 5/1415 | 248/125.8 |
| 6,179,260 B1 * | 1/2001 | Ohanian | A61G 7/05 | 248/219.4 |
| 6,231,016 B1 * | 5/2001 | Slone | A61G 5/10 | 248/125.8 |
| 6,290,194 B1 * | 9/2001 | Chaconas | A47G 9/0215 | 248/214 |
| 6,581,897 B2 * | 6/2003 | Ruschke | A61G 7/0533 | 248/539 |
| 6,585,206 B2 * | 7/2003 | Metz | A61G 7/0503 | 248/121 |
| 6,601,860 B2 * | 8/2003 | Potter | A61G 1/04 | 248/125.8 |
| 6,704,956 B2 * | 3/2004 | Riley | A61G 7/05 | 5/503.1 |
| 6,708,991 B1 * | 3/2004 | Ortlieb | A61M 5/1415 | 248/122.1 |
| 6,729,502 B2 * | 5/2004 | Lewis | A47K 5/1204 | 222/181.3 |
| 6,971,617 B2 * | 12/2005 | Nguyen | A61G 13/101 | 248/286.1 |
| 7,216,382 B2 * | 5/2007 | Newkirk | A61G 7/0503 | 248/125.1 |
| 7,418,749 B2 * | 9/2008 | Graham | A61G 7/0503 | 248/158 |
| 7,676,865 B2 * | 3/2010 | Graham | A61M 5/1417 | 5/503.1 |
| 8,381,335 B2 * | 2/2013 | Ahlman | A61B 6/0442 | 5/503.1 |
| 8,733,719 B2 * | 5/2014 | Gaal | A61M 5/1415 | 248/218.4 |
| 8,807,376 B1 * | 8/2014 | Mastors | A61M 5/14 | 220/481 |
| 8,898,836 B1 * | 12/2014 | Puri | A61G 7/0503 | 5/503.1 |
| 9,033,162 B2 * | 5/2015 | Brotzman | A61B 50/15 | 211/85.13 |
| 9,050,620 B2 * | 6/2015 | Mireles | A61L 2/22 | |
| 9,469,438 B2 * | 10/2016 | Nool | A61G 13/101 | |
| 10,226,570 B2 * | 3/2019 | La Berge | A61G 5/10 | |
| 10,582,981 B2 * | 3/2020 | Childs | A61G 7/0503 | |
| 2003/0052787 A1 * | 3/2003 | Zerhusen | G05B 15/02 | 340/573.1 |
| 2004/0199996 A1 * | 10/2004 | Newkirk | A61G 12/004 | 5/81.1 R |
| 2005/0217019 A1 * | 10/2005 | Johnson | A61H 35/02 | 4/620 |
| 2006/0031989 A1 * | 2/2006 | Graham | A61G 7/0503 | 5/610 |
| 2007/0069093 A1 * | 3/2007 | Graham | A61G 12/002 | 248/231.71 |
| 2007/0257803 A1 * | 11/2007 | Munro | G08B 21/245 | 340/573.1 |
| 2009/0236254 A1 * | 9/2009 | Jenkins | A47K 5/12 | 206/459.5 |
| 2010/0117823 A1 * | 5/2010 | Wholtjen | G08B 21/245 | 340/539.13 |
| 2010/0187373 A1 * | 7/2010 | Rowe | A47K 5/12 | 248/133 |
| 2010/0212087 A1 * | 8/2010 | Leib | G16H 40/20 | 5/81.1 R |
| 2013/0140781 A1 * | 6/2013 | Prather | A61H 3/04 | 280/47.38 |
| 2014/0375457 A1 * | 12/2014 | Diaz | G08B 21/245 | 340/573.1 |
| 2015/0254964 A1 * | 9/2015 | Raichman | A61G 11/00 | 340/573.1 |
| 2016/0136356 A1 * | 5/2016 | Ribble | A61G 7/0528 | 604/111 |
| 2016/0249623 A1 * | 9/2016 | Warning | A47K 5/12 | 424/661 |
| 2017/0032656 A1 * | 2/2017 | Morgan | G08B 21/245 | |
| 2017/0076042 A1 * | 3/2017 | Katz | G16H 40/20 | |
| 2018/0116882 A1 * | 5/2018 | Shaw | F21S 43/26 | |
| 2018/0144609 A1 * | 5/2018 | Marra | G08B 5/36 | |

* cited by examiner

HAND HYGIENE SYSTEM AND METHOD OF USE

BACKGROUND

1. Field of the Invention

The present invention relates generally to hygiene systems, and more specifically, to hand hygiene systems and method of use for the medical industry. In particular, to a hygiene system configured to secure to the bed of the patient.

2. Description of Related Art

Hand hygiene systems are well known in the art and are typically found secured to a wall and/or other similar stationary structure within a hospital. It should be understood that hand hygiene compliance in health care facilities is an important action that healthcare givers can take to protect patients, guest, and co-workers against the spread of germs and infections. It will be appreciated that many companies and individuals have invented products that hold hand hygiene products that are most accessible for workers, patients, and guest. Unfortunately, healthcare workers complain that placement is some areas does not lend for easy access, are not close in proximity to the patient at all times, or there is not enough space to safely place hand hygiene products and floor stands; making it difficult for healthcare workers, patients, guest, and others to be able to access these products in a timely manner, making compliance and accountability lower then needs to be to keep people safe. It is of the upmost important for hand hygiene to be completed immediately and prior to accessing the patient and others.

As shown in FIG. 1, an oblique view of a conventional patient bed 101 is shown having a cushion 103 supported by and confined within a structure 105 that includes a plurality of wheels 107 that enable mobility within the facility (not shown). During use, the bed 101 is handled by a plurality of care givers that leave germs on the cushion, structure, the hand bars, and/or other locations accessible for the patient and/or other third parties. Although great strides have been made to prevent the spread of germs, it is sometimes difficult to sanitize the hands prior to handling the bed. Accordingly, shortcomings remain and the present invention is tailored to overcoming these limitations.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
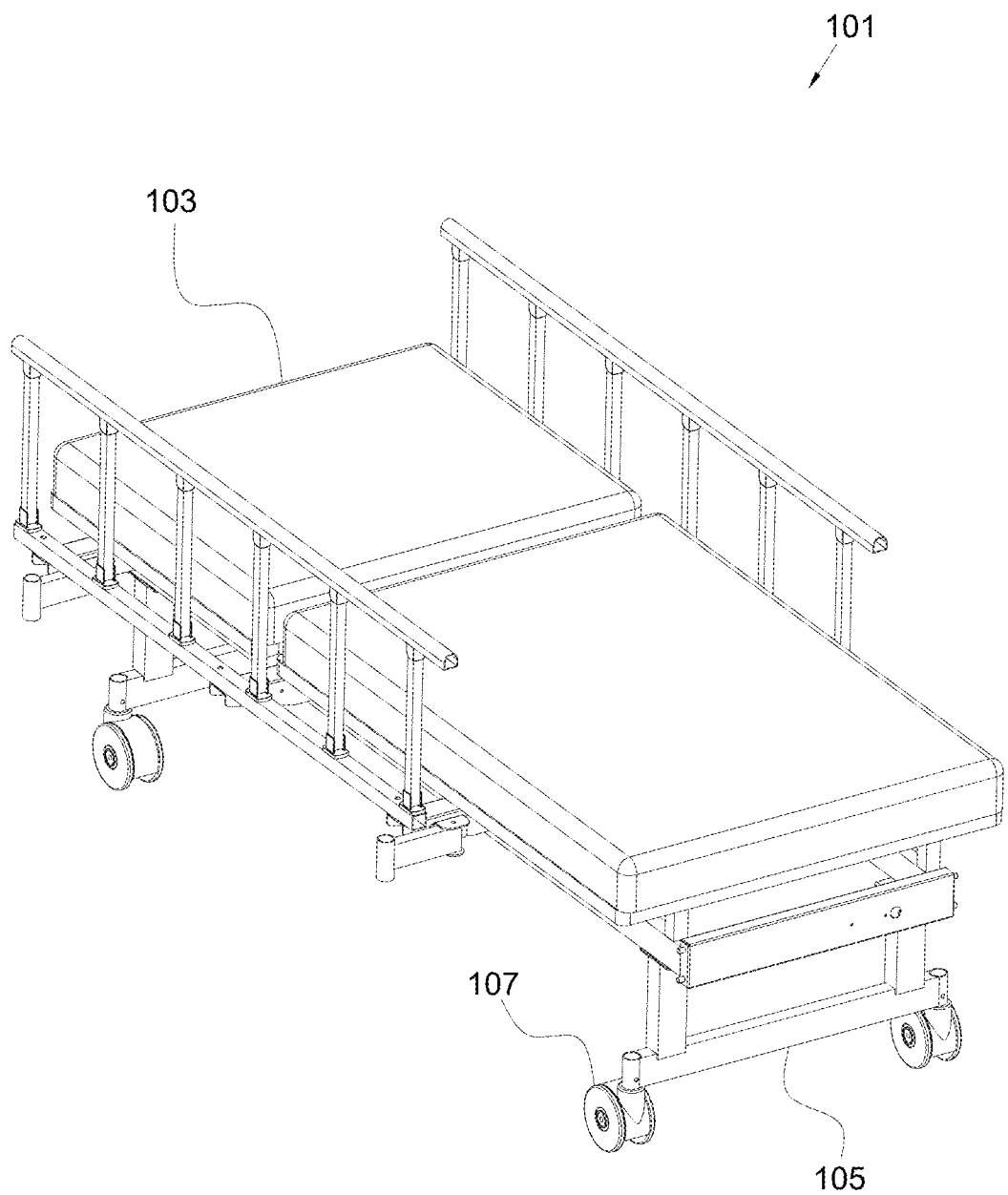
FIG. 1 is an oblique view of a conventional bed.
Figure 2:
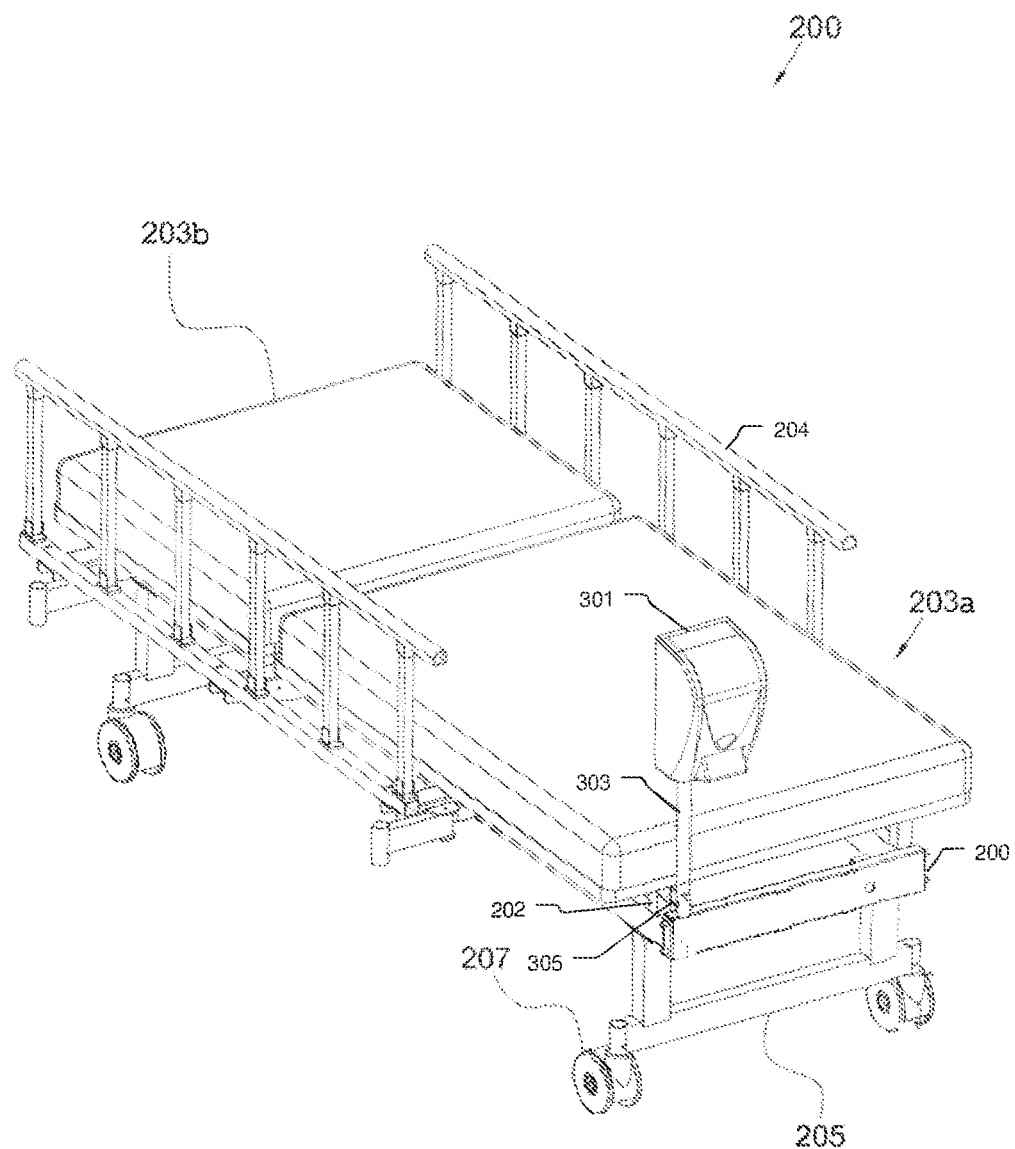
FIG. 2 is an oblique view of a bed system and method of use in accordance with a preferred embodiment of the present application.
Figure 3:
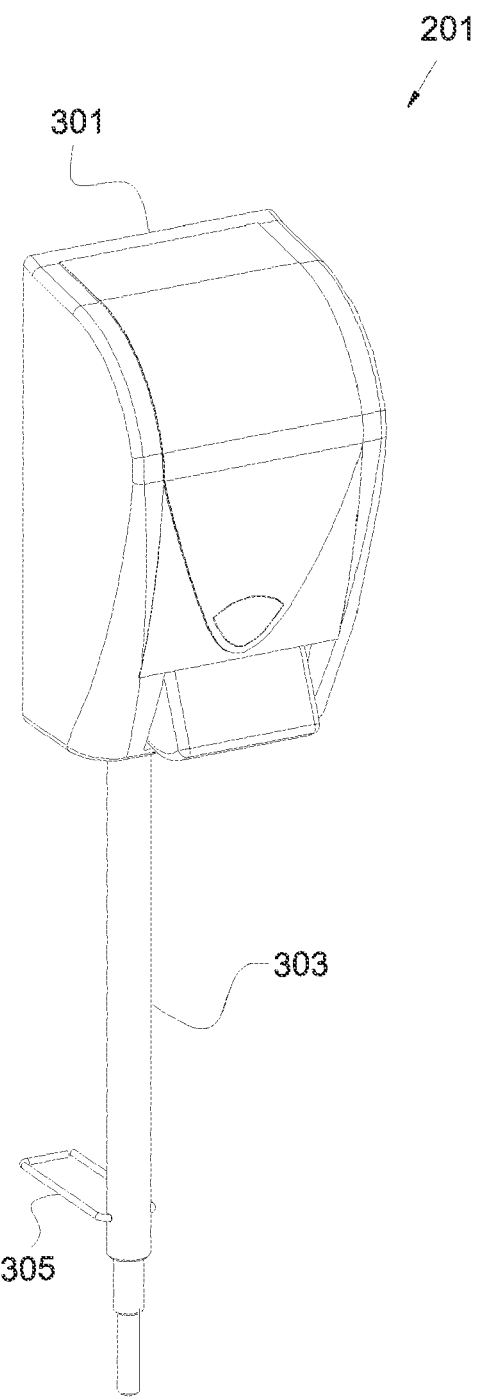
FIG. 3 is an oblique view of the sanitary device of the system of FIG. 2.
Figure 4:
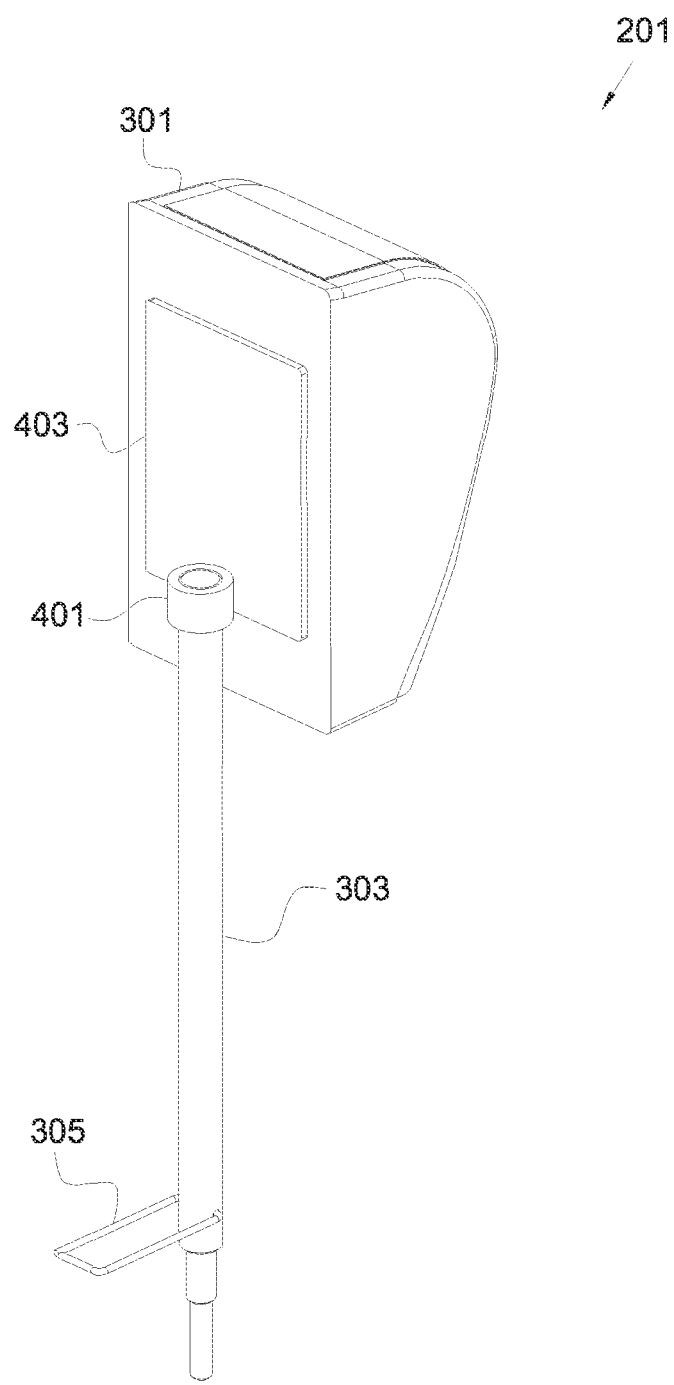
FIG. 4 is a back view of the sanitary device of FIG. 3.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Referring now to the drawings wherein like reference characters identify corresponding or similar elements throughout the several views, FIG. 2-5 depict various embodiments that display the system configured to further enhance the aesthetically pleasing appearance of a vehicle. It should be understood that the embodiments discussed herein are substantially similar in form and function and share one or more of the features discussed in each embodiment although the features may not be shown specifically with reference to the particular embodiment.

Referring specifically to FIGS. 2-5 a bed system 200 is shown having a bed 203b supported by support structure 203a having a plurality of horizontal members 200, 205 along with hand rails 204 and a plurality of vertical members 202. During use the members 200, 205 and hand rails are configured to retain the bed 203b at an elevated position to the ground surface (not shown). System 200 is further provided with a plurality of wheels 207 secured to member 205 for moving the bed system 200 on a ground surface (not shown). It will be appreciated that the features discussed herein are utilized with beds; however, it will be appreciated that the features of the system could be utilized with other structure, including wheelchairs, EMS stretchers, hospital beds, and so forth.

One of the points of novelties believed unique to the present invention is the use of a sanitizer device 201 configured to removably secured to the bed structure 203a and configured to provide hand sanitation means for the health caregiver and/or other third party.

Device 201 includes a housing 301 configured to store and dispense sanitizer means, e.g., a liquid, wipes, and so forth. The housing 301 preferably is removably secured to a plate 403 that rigidly attaches to an elongated pole 303 via a collar 401. In one preferred embodiment, the housing 301 includes a liquid sanitizing fluid stored within and dispensed from housing 301. The preferred embodiment also includes the features of removably attaching to the plate 403 and configured to secure to a wall structure (not shown).

The elongated pole 303 is configured to secure directly within a hole for stability. The system 201 is further provided with a cord 305 secured to pole 303 and configured to secure the pole to a vertical member and/or other members of the bed structure 203. In the preferred embodiment, a cord and the end of the pole 303 are utilized to secure the housing 301 to the bed structure 203a; however, it will be appreciated that other fastening means are also contemplated. For example, a quick-release device such as a hook-loop fastener, magnet, snap, clip and/or other means to secure the housing 301 to the bed structure 203a are also contemplated. It will be appreciated that in alternative embodiments, a lanyard or similar device could be used in lieu of the cord. It should also be appreciated that the pole 303 could be movable to different parts of the bed in lieu of being stationary in one location.

Figure 5:
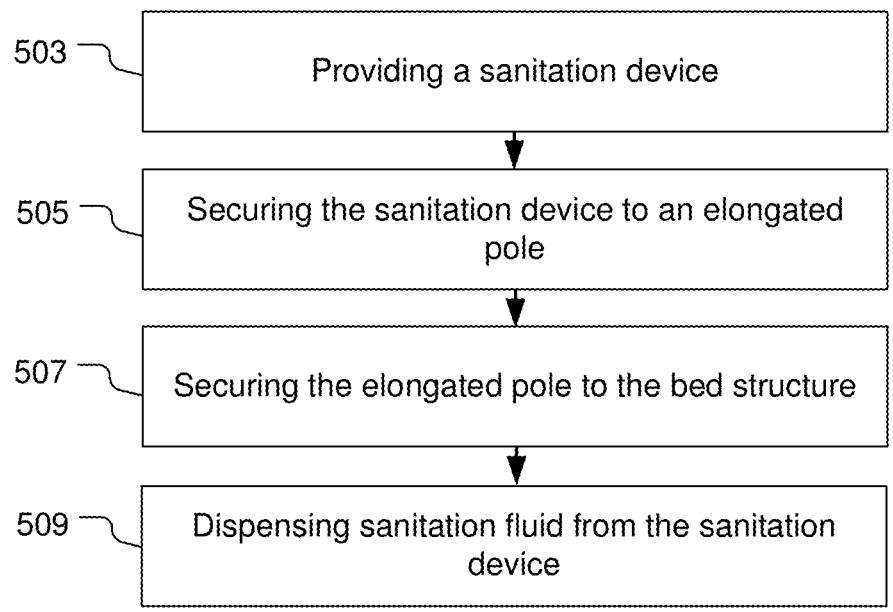
FIG. 5 is a flowchart of the method of the preferred embodiment.

Referring now to FIG. 5 in the drawings, a flowchart 501 illustrates the various steps required to preform the features of the system 201 discussed herein. The first step, as shown in box 503 includes the process of providing a sanitation device configured to store sanitation fluid therein. The sanitation device is secured to an elongated pole, which in turn is secured to the bed, as shown in boxes 505, 507. Thereafter, the sanitation liquid is dispensed from the sanitation device, as shown in box 509.

It will be appreciated that the features discussed above could be utilized on any hole associated with the vehicle.

Figure 6:
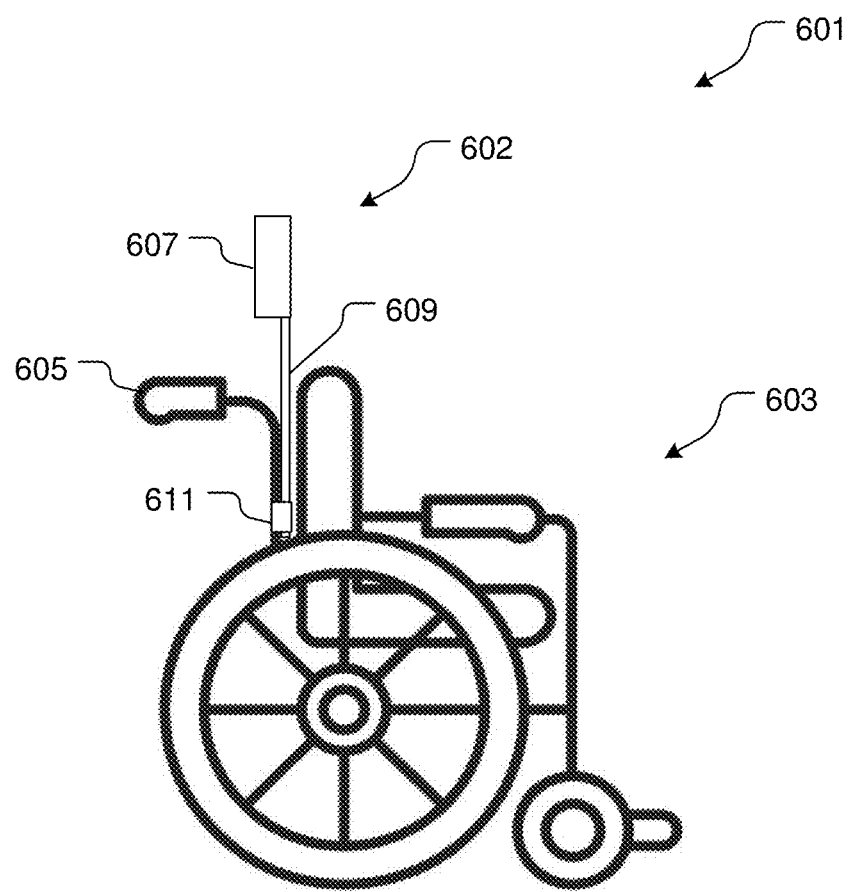
FIG. 6 is a side view of a hygiene system and method of use in accordance with an alternative embodiment of the present application.
Figure 7:
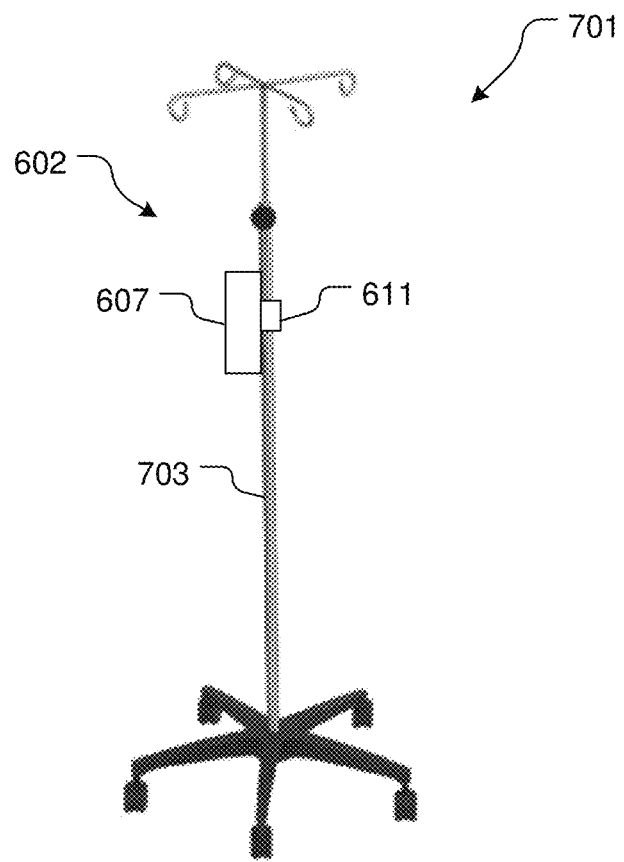
FIG. 7 is a side view of a hygiene system and method of use in accordance with an alternative embodiment of the present application.
Figure 8:
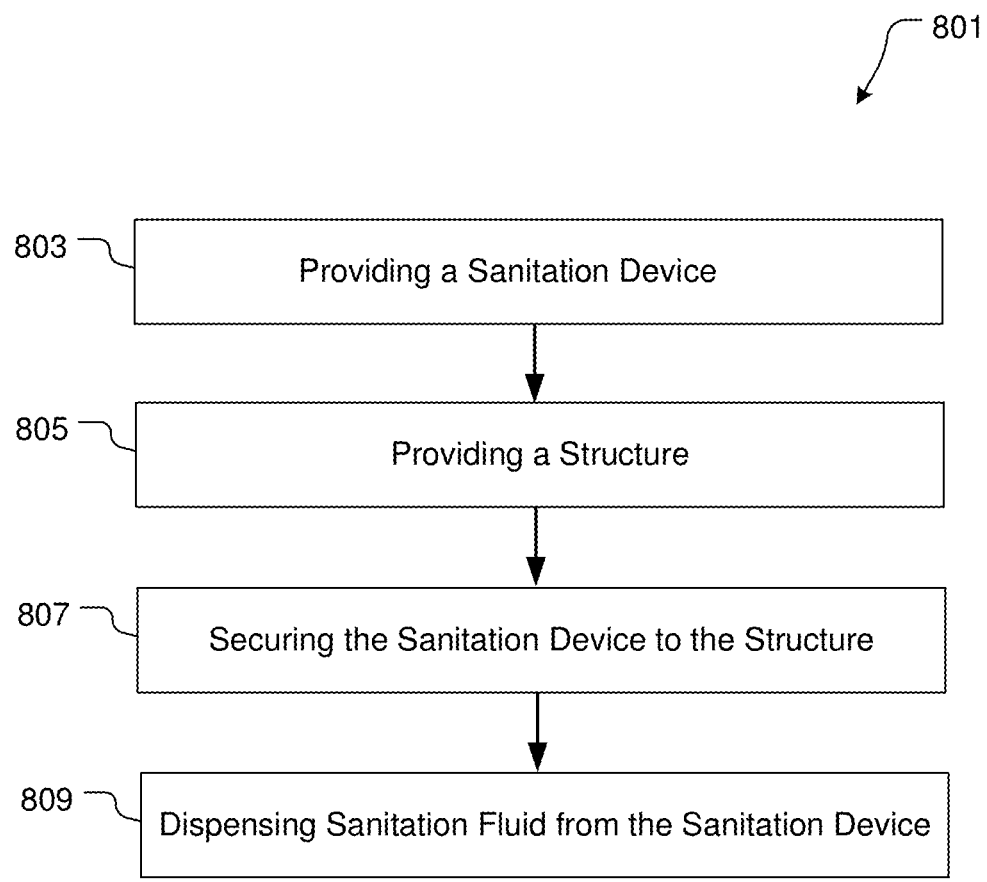
FIG. 8 is a flowchart of the method of the alternative embodiment.

Referring now to FIGS. 6-8 in the drawings, alternative embodiments of the present invention are shown. It will be appreciated that the systems of the alternative embodiment include one or more of the features discussed above with respect to the system 201; however, it is contemplated utilizing a hygiene system that can be used with wheelchairs, saline stands, and other suitable movable and stationary structures.

In FIG. 6, a hygiene system 601 is shown with a wheelchair 603 configured to carry a sanitation device 602 via one or more members 605. In the exemplary embodiment, the sanitation device 602 is secured to member 605 via a shaft 609 attached thereto via a fastener 611 at a first end. The shaft 609 supports the sanitation dispensary 607. During use, a user activates the dispensary 607 that stores fluid therein to rid of germs. Sanitation device 602 could secure to other members of the wheelchair 603 although not shown in the drawings.

In FIG. 7, a hygiene system 701 is shown with a saline stand 703 configured to carry the sanitation device 602. In the preferred embodiment, the device 602 includes a fastening device 611 configured to secure directly to the stand 703, as shown. Device 602 could secure to other members of the stand 703 although not shown in the drawings.

In FIG. 8, a flowchart 801 depicts the alternative method of use. The steps include providing the sanitation device, providing a structure, securing the sanitation device to the structure, and dispensing fluid from the sanitation device. These features are shown in boxes 803, 805, 807, and 809. It will be appreciated that the sanitation device 602 could be secured to other types of structures, both moving and stationary, in other contemplated embodiments.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A sanitizer system and a movable support system comprising: a movable support structure; and
a sanitizer device consisting of:

an elongated pole extending from a first end to a second end, the first end is tapered and configured to removably engage with the movable support structure;

a cord secured to the first end of the elongated pole, the cord is configured to removably engage with the mobile movable support structure; and a housing secured to the second end of the elongated pole by a plate attached to a back surface of the housing and a collar attached to and extending from the plate and engaged with the elongated pole;

wherein the sanitizer device is configured to dispense a material for removing germs.

2. A sanitizer system for a wheelchair system, the sanitizer system comprising: the wheelchair system comprising a support structure configured to secure the seat at a height relative to a floor; and a sanitizer device, consisting of:

an elongated pole extending from a first end to a second end, the first end is tapered and configured to removably engage with the support structure;

a cord secured to the first end of the elongated pole, the cord is configured to removably engage with the support structure;

a housing secured to the second end of the elongated pole by a plate attached to a back surface of the housing and a collar attached to and extending from the plate and engaged with the elongated pole;

wherein the sanitizer device is configured to dispense a material for removing germs.

* * * * *